Patented Jan. 5, 1932

1,839,800

UNITED STATES PATENT OFFICE

WILLIAM S. MURRAY, OF UTICA, NEW YORK, ASSIGNOR TO ONEIDA COMMUNITY, LIMITED, OF ONEIDA, NEW YORK, A CORPORATION OF NEW YORK

PROCESS FOR THE RECOVERY OF INDIUM

No Drawing.    Application filed January 11, 1929.    Serial No. 333,235.

This invention relates to an improvement in processes for the recovery of the metal indium and the separate recovery of zinc from ores containing said metals. While the primary object of the invention is to recover indium from ores containing the same associated with zinc, the invention also constitutes a great improvement in the methods of recovering the zinc itself. In prior processes for the recovery of zinc electrolytically from ores containing zinc associated with precious metals such as gold and silver, the recovery in an efficient manner of the gold and silver contributed largely to the economic success of the process for recovering the zinc. In the most satisfactory commercial processes heretofore employed for the recovery of zinc, it has been the practice, after first preparing a suitable calcine, to leach the calcine with sulfuric acid, the leaching step being carried on in such a manner that the resulting solution was neutral, or preferably slightly basic. In a process of this kind while the acid would in the first place dissolve the precious metals, such as gold, possibly silver, and indium if present in the ore, the subsequent step of rendering the solution neutral or basic resulted in the precipitation of the said metals so that they would be discharged with the solids. The solution, after suitable purification, finally reached the electrolytic cells where the zinc, carried by the solution, was plated out by a suitable electric current. The solids including the precipitates discharged from the neutral leaching tank, then required various treatments but finally were discarded in solid form and sent to the refinery for the extraction of the precious metals with any lead or other material which might have accompanied the gold and silver. In a process of this kind, if the original ore contained any indium, this followed the gold and silver to the end of the process up to the stage of refining, and as these refining processes were furnace processes the indium eventually was lost.

By the present invention the treatment is such as to remove the indium and any precious metals which might be present at as early a stage of the process as possible, thereby not only successfully recovering the indium but also avoiding losses of the precious metals which would occur by carrying out the steps hitherto employed for obtaining the precious metals from the solids.

With these general objects in view, the invention consists in the features and combination of steps which will first be described in connection with a specific example of the process and then more particularly pointed out in the claims.

In carrying out the process in its best form, the ore containing zinc associated with indium and, in most cases, gold, silver and some other metals, is first comminuted. This comminuted ore is advantageously subjected to a concentrating process, such as for example the well-known flotation process, in order to prepare a concentrate therefrom which will be rich in the values which it is desired to obtain. This concentrate is then roasted in any desired form of roasting furnace but under conditions where it will be supplied with abundant air and at a temperature advantageously between 550° and 650° C. In carrying out this roasting step it is important to avoid temperatures high enough to bring about the formation of insoluble zinc-iron compounds by the union of zinc with any iron which may be present in the ore. For this reason the roasting temperatures should not be allowed to go above 750° C. The purpose of the roasting process is to develop in the calcine a preponderance of zinc oxide together with an appreciable proportion of zinc sulfate. The amount of air, the temperature, the time of treatment and the amount of agitation to accomplish the desired result are well-known to those skilled in the art and hence need not be specifically stated here.

The proportions of zinc oxide and zinc sulfate are intended to be such that later in the process the amount of free sulfuric acid produced in the electrolytic cells will be substantially the amount suitable for carrying out the leaching of the calcines in the manner hereinafter described. The calcines obtained from the roasting furnace are subjected to the leaching action of the sulfuric acid solution, care being taken to maintain this solution always acid during the leaching operation and the separation of solids therefrom.

The apparatus employed for leaching the concentrates, the strength of the acid solution, the time of treatment of the concentrates, the amount of agitation and the temperature may be conducted in nearly the same ways as have heretofore been employed in the old practices for the recovery of electrolytic zinc, except that the leaching solution must never become other than acid, that is, it must never be basic or neutral.

After this acid leaching step has been completed, suitable steps are employed for separating the solids and the liquid in the usual manner, and, in case it is desirable, these solids may be subjected to suitable washing steps in order to fully recover any solution which may have clung to and been discharged with them.

In practice, the leaching may be done in what are known as "Pachuca tanks". The contents of these tanks are discharged through suitable classifiers, thickeners and filters whereby the liquids are separated from the solids and the latter washed. The result of the action of the classifiers, thickeners and filters is to produce an insoluble residue practically free from the metallic values with which this invention is concerned, and a solution containing all of these metallic values. The solids may be wasted except where they contain other values not soluble in sulfuric acid as, for example, lead, in which case the solids may be refined to recover such other values by furnace processes.

The acid solution is treated with metallic zinc in any desired form. In practice a finely comminuted zinc is employed. This may be obtained by granulating the zinc or by employing zinc dust as free from zinc oxide as can be obtained practically. This treatment of the solution with zinc is for the purpose of precipitating all the metallic values which can be so precipitated by zinc, this including particularly gold, silver, copper and indium.

In carrying out this treatment of the solution with metallic zinc any suitable apparatus may be employed, as for example the Pachuca tanks which are commonly in use for treating solutions of this kind. The contents of the tank are discharged to suitable apparatus for completely separating the solids from the solution, and where necessary, washing the solids. In practice it is generally sufficient to send the contents to a filter where the solids are separated and washed and practically freed from all liquids.

The solution obtained by the steps thus far described is intended to be subjected finally to electrolytic treatment in cells for the recovery of slab zinc, but before being sent to the electrolytic tanks the solution may be subjected to further purification steps where necessary to remove impurities which would interfere with the electrolytic process. One common step employed for purifying a solution of this kind is oxidation, as for example by adding manganese compounds or other compounds which will oxidize the impurities so that they can be easily separated from the solution. Furthermore, after this oxidizing treatment of the solution it may again be subjected to treatment with metallic zinc in comminuted form in order to remove any further copper, arsenic or cadmium which may be present in the solution. After the purification of the solution in this way, the practically pure solution goes to the electrolytic cells. The zinc is plated out and the free acid is returned to the calcine leaching Pachuca.

The solids from the filtering step hereinbefore referred to contain the gold, silver, the principal part of the copper, the metal indium, and possibly some other metallic values of less importance. The solids are then treated to recover the indium separately from the other accompanying metals. One way of doing this is to subject the solids to the action of sulfuric acid, in order to dissolve the metallic values which can be dissolved by this acid, such for example as the indium, gold, silver and that part of the copper which followed the solids.

In carrying out this step of the process a Pachuca tank of suitable size may be employed, and the strength of the acid solution and the length of time of treatment may be varied within a relatively wide range. For example, the strength of the acid solution may vary from 5% to 50%, and the time from four hours to 30 minutes. In general practice a solution having about 25% acid is very satisfactory and the solids may be subjected to its action for about 1½ to two hours. During the treatment of the solids with acid solution the heat generated by the reaction will raise the temperature of the solution very appreciably. This rise of temperature may be allowed to proceed to its limit, no attempt being made to cool the solution.

When substantially all the soluble values in the solids have been dissolved, the contents of the Pachuca tank may then be discharged into an ordinary tank where the acidity of the solution may, if necessary, be adjusted either by the addition of acid or of alkali so as to have an acidity of about 2½% to 4%. Thereafter hydrogen sulfide is passed into the tank in order to precipitate all those values which can be precipitated from an acid solution by hydrogen sulfide without precipitating any appreciable amount of indium. Indium is not precipitated by hydrogen sulfide from acid solution unless the treatment is carried too far. The values precipitated by this treatment are particularly gold, silver, and copper, and if properly carried out the indium remains in solution.

The solids, including the precipitates resulting from the hydrogen sulfide treatment are separated from the solution in any suitable way, but preferably in a filter press and are ready to be sent through the usual furnace refining processes for the recovery of the gold, silver and copper.

The solution is freed from any remaining hydrogen sulfide by any suitable step, as for example, by blowing it with air or by boiling it. Then the solution is sent to an electrolytic cell where the indium is plated out. This metal is practically pure, if all the steps have been carefully carried out. If, however, it be found to contain any undesirable accompanying impurities, it may be further refined by the well known methods. The sulfuric acid set free from the indium in plating it out, may be returned to the original calcine leaching Pachuca.

Instead of treating the precipitate set free by metallic zinc with sulfuric acid, as hereinbefore described, it is often convenient to use nitric acid instead of the sulfuric acid. In carrying out such a treatment the precipitate is subjected to nitric acid having a strength of about 5 to 10 per cent. The temperature of the solvent seems to be unimportant. In practice this step requires about two hours for completion. Then ammonium hydroxide is added to the solution to form a precipitate. It will be found that the indium is thrown out in this precipitate in the form of a hydroxide. The precipitate containing this indium hydroxide is filtered and washed in any suitable manner, the filtrate being discarded. The filtered and washed precipitate will contain the indium hydroxide substantially free from zinc and nitrates. Also it will contain the gold and silver. Then the said precipitate is subjected to the action of hydrochloric acid to dissolve the indium. The resulting solution is subjected to the action of hydrogen sulfide gas. The said gas precipitates the values other than indium provided the gas treatment is not carried on too long. The solution is filtered and the precipitates washed, the precipitated sulfides being ready for the usual refining treatment for the recovery separately of gold, silver and any other values which will be precipitated by hydrogen sulfide from an acid solution. The filtrate is aerated or heated to expel any hydrogen sulfide remaining in it. Then it is subjected to electrolytic treatment to plate out the indium, the spent bath fluid containing hydrochloric acid and iron chloride. The acid solution if not too high in iron chloride may be used at least in part in dissolving more precipitate thrown down from the nitric acid solution by ammonium hydroxide The modified sub-process using nitric acid as a solvent and finally giving a hydrochloric acid solution has the objection that the nitric acid is entirely lost and there is a continuous gradual loss of hydrochloric acid as iron chloride, so that under most circumstances the sub-process first described which uses sulfuric acid and returns the same for leaching further calcine is to be preferred. But under some circumstances as where the iron content of the precipitate is low, the modified process can be used if desired.

What I claim is:

1. The process of separately recovering indium, zinc and precious metals from ores containing the same, which consists in first producing a concentrate from said ores, calcining the concentrate, leaching the calcine with sulfuric acid while maintaining the acidity of the leaching solution, separating the solids from the solution while maintaining the acidity of said solution, subjecting the solution to the action of metallic zinc and thereby forming a precipitate, separating said precipitate from the solution, purifying the solution, electrolyzing the purified solution to recover the zinc and free the acid, employing said acid to leach further calcine, and from the said precipitate separately recovering the indium and the other metallic values.

2. The process of separately recovering indium, zinc and precious metals from ores containing the same, which consists in first producing a concentrate from said ores, calcining the concentrate, leaching the calcine with sulfuric acid while maintaining the acidity of the leaching solution, separating the solids from the solution while maintaining the acidity of said solution, subjecting the solution to the action of metallic zinc and thereby forming a precipitate, separating said precipitate from the solution, purifying the solution, electrolyzing the purified solution to recover the zinc and free the acid, employing said acid to leach further calcine, treating the precipitate with sulfuric acid solution, then subjecting the solution to the action of hydrogen sulfide, separating the liquid from the solids, refining the solids to recover gold and silver, expelling the hydrogen sulfide from the liquid, electrolyzing the liquid to plate out the indium and set free the acid, and using the acid to leach further calcine.

3. The process of separately recovering indium from indium-containing zinciferous ores which consists in obtaining an indium-bearing precipitate from an electrolytic zinc recovery process by first producing a concentrate from said ores, calcining the concentrate, leaching the calcine with sulfuric acid while maintaining the acidity of said solution, separating the solids from the solution while maintaining the acidity of the solution, subjecting the solution to the action of metallic zinc and thereby forming an indium-bearing precipitate, separating said precipitate from the solution, and from said precipitate separately recovering the indium.

4. The process of separately recovering indium from indium-containing zinciferous ores, which consists in obtaining an indium-bearing precipitate from an electrolytic zinc recovery process by first producing a concentrate from said ores, calcining the concentrate, leaching the calcine with sulfuric acid while maintaining the acidity of said solution, separating the solids from the solution while maintaining the acidity of the solution, subjecting the solution to the action of metallic zinc and thereby forming an indium-bearing precipitate, separating said precipitate from the solution, treating the precipitate with sulfuric acid solution, then subjecting the solution to the action of hydrogen sulfide, separating the liquid from the solids, expelling the hydrogen sulfide from the liquid, and electrolyzing the liquid to plate out the indium and set free the acid.

In testimony whereof, I have hereunto set my hand.

WILLIAM S. MURRAY.